«12» United States Patent
Cook et al.

(10) Patent No.: US 9,151,595 B1
(45) Date of Patent: Oct. 6, 2015

(54) LASER THICKNESS GAUGE AND METHOD INCLUDING PASSLINE ANGLE CORRECTION

(71) Applicant: Advanced Gauging Technologies, LLC, Plain City, OH (US)

(72) Inventors: Scott A. Cook, Plain City, OH (US); Michael C. Bertin, Irvine, CA (US); Derrick Baker, Columbus, OH (US)

(73) Assignee: Advanced Gauging Technologies, LLC, Plain City, OH (US)

( * ) Notice: Subject to any disclaimer, the term of this patent is extended or adjusted under 35 U.S.C. 154(b) by 0 days.

(21) Appl. No.: 14/256,416

(22) Filed: Apr. 18, 2014

(51) Int. Cl.
*G01B 11/28* (2006.01)
*G01B 11/06* (2006.01)

(52) U.S. Cl.
CPC ..................................... *G01B 11/06* (2013.01)

(58) Field of Classification Search
CPC .... G01B 11/06; G01B 11/0625; G01B 7/105; G01B 11/0683; G01B 11/0675; G01B 17/02; G01B 11/0616; G01B 11/0633; G01B 11/0641; G01B 11/0691; G01B 11/0666; G01B 15/02; G01B 21/08; G01B 7/06
See application file for complete search history.

(56) References Cited

U.S. PATENT DOCUMENTS

| | | | |
|---|---|---|---|
| 3,671,726 A * | 6/1972 | Kerr | 702/172 |
| 4,068,955 A | 1/1978 | Bodlaj | |
| 4,192,612 A | 3/1980 | Bodlaj | |
| 5,661,250 A * | 8/1997 | Katahira et al. | 73/865.8 |
| 6,281,679 B1 | 8/2001 | King et al. | |
| 6,757,069 B2 | 6/2004 | Bowles | |
| 7,199,884 B2 | 4/2007 | Jasinski et al. | |
| 7,528,400 B2 * | 5/2009 | Duck et al. | 250/559.23 |
| 7,847,943 B2 | 12/2010 | Hellstrom et al. | |
| 2003/0009894 A1 * | 1/2003 | Yamamoto | 33/501.02 |
| 2013/0083324 A1 * | 4/2013 | Wilhelm | 356/431 |

* cited by examiner

*Primary Examiner* — Michael P Stafira
(74) *Attorney, Agent, or Firm* — Frank H. Foster; Kremblas & Foster

(57) ABSTRACT

A laser thickness gauge has three laser displacement sensors each transmitting a laser beam onto a target web. Two sensors are spaced along the web and face one surface of the web and the third sensor faces the opposite surface. The thickness of a web that is positioned along a passline plane between the sensor is measured even when the passline plane is not perpendicular to the beams of the sensors. A data processor computes the passline angle from the distance measurements communicated from the three sensors. During setup and calibration, data representing physical characteristics of the gauge are measured and stored and during operation are processed with currently measured data to generate correction factors that are used to correct thickness measurements determined from the three laser sensors.

13 Claims, 2 Drawing Sheets

LASER THICKNESS GAUGE AND METHOD INCLUDING PASSLINE ANGLE CORRECTION

CROSS-REFERENCES TO RELATED APPLICATIONS (Not Applicable)

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

FIELD OF THE INVENTION

The invention is an industrial measurement device and associated method that measure in real time the thickness of any web of a flat material, such as in strip, sheet or coil form, while the web is being processed. More particularly, the invention uses laser beams from at least three laser sensors and measures the web thickness even when the web is oriented along a web passline that is oblique; that is, not perpendicular to the three laser beams of the sensors. Embodiments of the invention can also be calibrated to correct measurement errors resulting from misalignment of the laser beams, temperature variations and additional unknown errors that are inherent in any practical thickness gauge.

BACKGROUND OF THE INVENTION

In many industrial manufacturing processes it is desirable to measure the thickness of a web in the form of plate, sheet, strip or coil of material. Although the web may be stationary at the time of measurement, it is common to measure a web as it travels by a conveyer in a longitudinal direction in a path along or through some type of machinery. For example, in the rolling of steel to reduce the thickness of the steel to a nominal thickness, the web of steel is measured to assure that it is meeting particular thickness specifications.

Devices for making such measurements have been developed in the prior art using nuclear radiation as well as beams of light, including laser beams. Most of these measuring devices assume that the web is aligned along an assumed passline that is perpendicular to the light beam or other radiation. Consequently, any angular deviation of the actual passline of the web from the assumed passline results in an error in the measured thickness. There are prior art devices that are designed to stabilize and maintain the assumed passline angle. There are other devices that sense the passline angle of the web and correct the measurement for the detected passline angle by projecting a geometric image on the web and analyzing the shape and relative dimensions of the image to determine a passline angle. Other devices scan a line across the web and use timing to detect locations. Still others use light of differing wavelengths. Some devices require a complex arrays of light beams and, like those that project an image, require an equally complex algorithm for extracting the passline angle data. The more complicated that the hardware arrangements, the light arrays and the detection algorithms are, the more opportunities that exist for introducing errors into the measurements.

There is, therefore, a need for a thickness gauge that measures the actual passline angle of the web and uses that measurement to make measurement correction but that is not so complex as the prior art so that it is not only less costly but also eliminates many opportunities for errors.

There is also a need for such a thickness gauge that can make additional corrections for laser beam misalignment, temperature variations and for unknown errors that are an inherent part of any measurement apparatus.

BRIEF SUMMARY OF THE INVENTION

The invention is a laser thickness gauge that detects the thickness of a target web extending along a passline plane. The thickness gauge includes three laser displacement sensors that transmit parallel laser beams onto the target web. A pair of the sensors are spaced apart by an air gap distance A. One of the pair is spaced from a first side of the passline plane and the second of the pair is spaced from the opposite side of the passline plane. The sensors direct their laser beams parallel to and toward each other and intersect a reference plane at 90°. This pair of sensors provides signals representing the distances S1 and S2 between the respective sensors and the web.

The third laser displacement sensor is also spaced from the passline plane and is located on the same side of the passline plane as one of the pair of laser sensors and is spaced along the passline from that sensor by a distance DS. The third sensor outputs a signal representing the distance S3 between the third sensor and the target web.

A digital data processor stores the value A and receives in real time the signals representing the distances S1, S2 and S3. The processor computes in real time a measured thickness Tm of the target web in accordance with $$\tan \theta = (S2-S3)/DS,$$

$$\text{passline angle } \theta = \arctan(\tan \theta) \text{ and}$$

$$Tm = (A-S1-S2)\cos \theta.$$

wherein $\theta$ is an angle between the passline plane and the reference plane.

Figure 1:
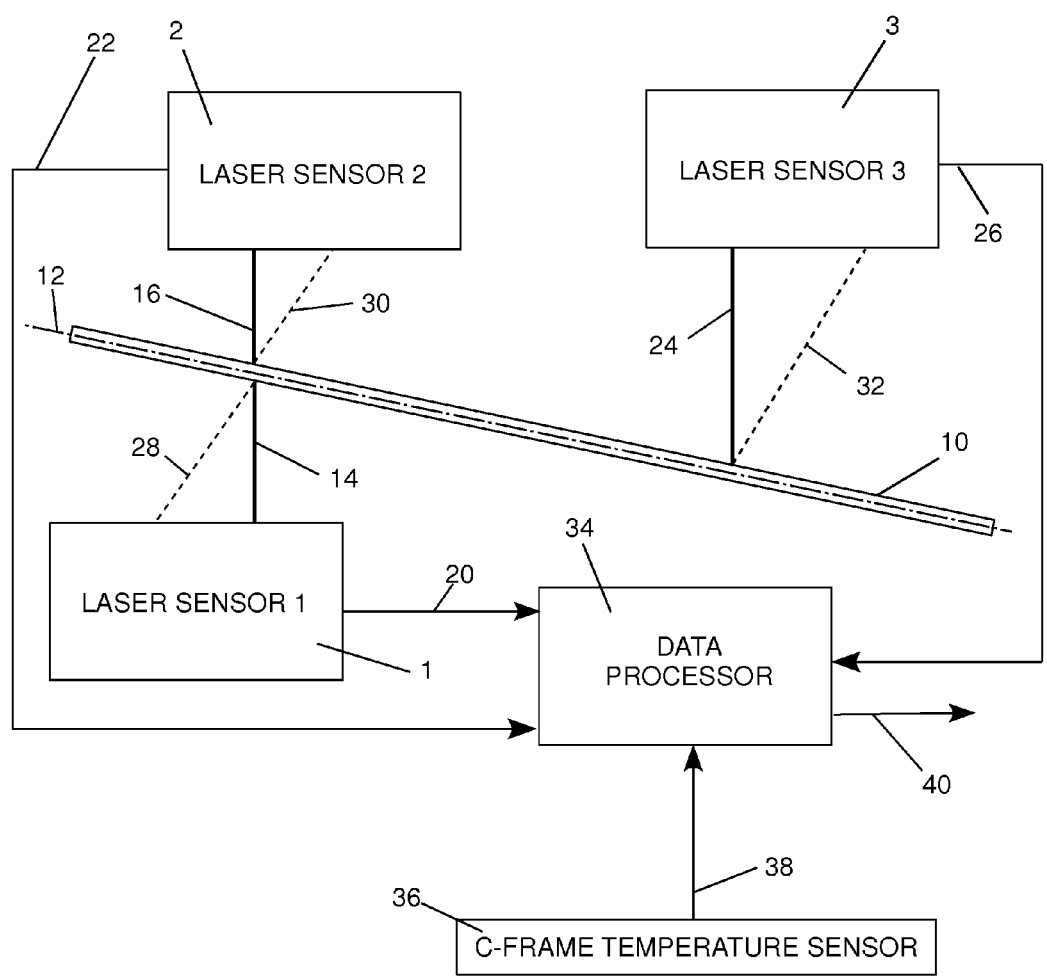
FIG. 1 is a diagrammatic view of the hardware arrangement of a thickness gauge embodying the invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Hardware Arrangement

FIG. 1 illustrates a laser thickness gauge embodying the invention for detecting the thickness of a target web 10 extending along a passline plane 12. In order to minimize the clutter of reference numerals, variables and dimensions in any one figure, FIG. 2 replicates several of the component structures shown in FIG. 1 and additionally shows the principal variables and constants that are processed in accordance with the invention and are referred to in the following description.

Figure 2:
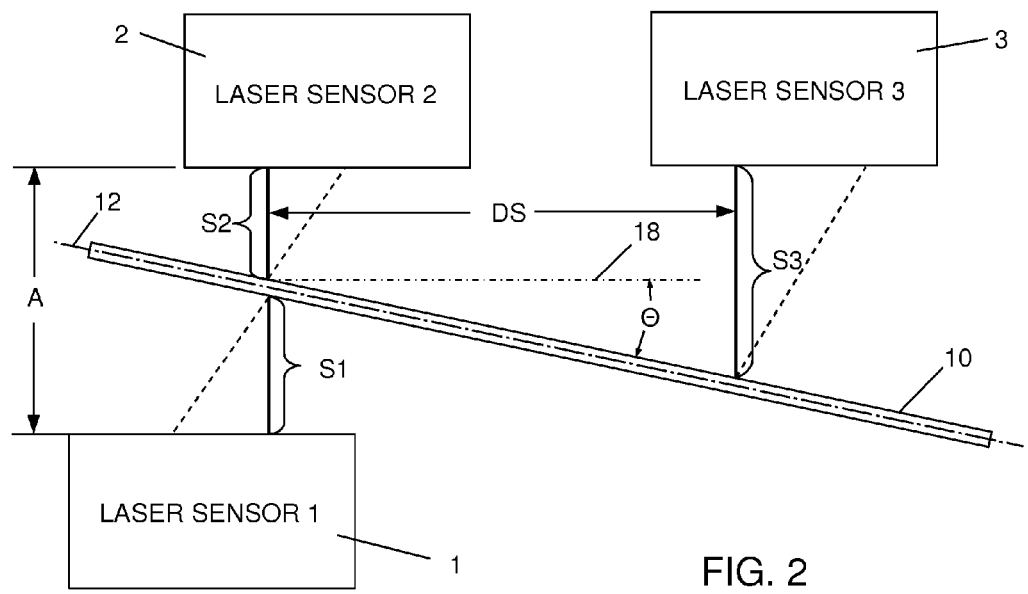
FIG. 2 is a view like FIG. 1 but with dimensional variables inserted that are used in the data processing component of the invention.

Referring to FIGS. 1 and 2, a pair of laser displacement sensors 1 and 2, each capable of transmitting respective laser beams 14 and 16, are spaced apart by an air gap distance A. For example, a typical air gap distance A would be in the range of 40 mm to 310 mm and is dependent upon the range of thickness that will be measured. The first laser sensor 1 is spaced from a first side of the passline plane 12. The second laser sensor 2 is spaced from the second, opposite side of the passline plane 12.

The sensors 1 and 2 are oriented to direct their laser beams 14 and 16 toward each other so that the beams 14 and 16 are parallel to each other and perpendicular to a reference plane 18 and are preferably aligned colinearly. Persons skilled in the art will recognize however that minor deviation from perfectly parallel will give acceptably accurate measurements. An acceptable tolerance range of deviation from parallel is believed to be about 1.8 degrees and still be considered parallel because results having acceptable accuracy for many applications of the invention are still obtained.

The passline plane 12 intersects the reference plane 18 at a passline angle θ. The first laser sensor 1 has an output 20 providing a signal representing the distance S1 between the first sensor and the spot where the laser beam 14 is incident on the web 10. The second laser sensor 2 has an output 22 providing a signal representing the distance S2 between the second sensor 2 and the spot where the laser beam 16 is incident on the web 10.

A third laser displacement sensor 3 is located on the same side of the passline plane 12 as the second laser sensor 2 and is also capable of transmitting a laser beam 24. The third laser displacement sensor 3 is spaced from the passline plane 12 and is also spaced longitudinally along the web 10 from the second sensor 2. The laser beam 24 of sensor 3 is spaced along the passline plane 12 by a distance DS away from the laser beam 16 of the second sensor 2. For example, a typical value of DS would be on the order of 135 mm. The third sensor 3 is oriented to direct its laser beam 24 parallel to the laser beams 14 and 16 of the pair of laser sensors 1 and 2. Sensor 3 has an output 26 that provides a signal representing the distance S3 between the third sensor 3 and the spot where the laser beam 16 is incident on the web 10.

Although not illustrated because it is known in the prior art, all three laser sensors 1, 2 and 3 are preferably mounted to a C-frame. The C-frame has two arms that extend laterally across the web, and usually perpendicular to the web 10, with each arm spaced from a different one of the opposite surfaces of the web. Laser sensors 2 and 3 are mounted to one of the two C-frame arms and the other laser sensor 1 is mounted to the other arm. The two C-frame arms are joined together laterally beside the web and the entire C-frame, carrying the laser sensors 1, 2 and 3, is arranged to be reciprocated laterally of the web. That motion allows positioning of the group of three laser sensors at selected locations laterally across the web 10 so that a user can measure the thickness laterally anywhere across the web. However, as the C-frame is moved, the laser sensors 1, 2 and 3 maintain the same relative positions illustrated in FIGS. 1 and 2. Preferably, the C-frame would be driven in partial rotation by an electric motor, about a longitudinal axis that is parallel to the arm. The forward legs of the C-frame may pivot in relation to the I-beam upon which it is mounted. That permits a control system to realign the beams of the laser sensors in the event that they become misaligned as a result of flexing, distortion or imprecise movement of the C-frame.

The described mounting arrangement permits the laser sensors 1, 2 and 3 to be positioned with the reference plane 18 and the passline plane 12 in any orientation, horizontal, vertical or oblique. Similarly, the laser sensor 1 can be on either side of the web 10, for example above or below, with the sensors 2 and 3 on the opposite side of the web 10.

All three of the individual laser sensors 1, 2 and 3 can be commercially available laser displacement sensors such as models LK-H027, LK-H057, LK-H087 and LK-H157 from Keyence Corporation. These are ultra high speed/high accuracy laser displacement sensors using diffuse reflection. Each laser sensor 1, 2 and 3 has a data output port that provides a data signal representing a distance or range from a reference point at the laser gauge to a surface that is within the gauge's measurement range. These laser sensors include a laser that directs a laser beam onto a target surface to form a spot of light on the surface. They also have an RS-CMOS element for receiving a two dimensional image of the spot via light reflections 28, 30 and 32 from the surface of the web 10. Each laser sensor also includes a data processing unit with stored software that analyzes the image of the spot and outputs the sensed distance. Considered in more detail, the sensor's laser beams illuminate a line along the surface of the web that varies in intensity along the line. The distribution of light along the line is more concentrated near its center. Video image processing is used by the laser gauges to find the spot of maximum intensity along the line which is then used as the spot for determining the respective distances S1, S2 and S3 from the laser gauges to the web 10.

The distance output data from the laser sensors 1, 2 and 3 are communicated from their respective data outputs 20, 22 and 26 to a digital data processor 34, such as an industrial computer, preferably via a TCP/IP communication link. The data processor 34 has the conventional storage memory, processing unit, I/O units and other components that are needed and known in the prior art for processing the information that is input into the data processor 34 input terminals preferably in the form of digital signals. The data processor also has an output 40 that outputs a signal representing the thickness of the web 10.

There are several sources of error that the present invention is able to correct for. Correction of these errors is important because users are measuring the thickness of webs in dimensions measured in microns. Embodiments of the invention correct for: (1) non-colinearity of the laser beams 14 and 16 of laser gauges 1 and 2; (2) variations in the temperature of the embodiment, especially errors resulting from expansion and contraction of the C-frame; and (3) miscellaneous unidentified errors that are inherent in any equipment and, in the invention, are lumped together in an empirically derived correction factor. The measured thickness value Tm, made by the three laser sensors 1, 2 and 3 is corrected by subtracting, from that thickness measurement Tm, a correction factor for each of the above-described sources of error to provide an actual thickness Ta.

Figure 3:
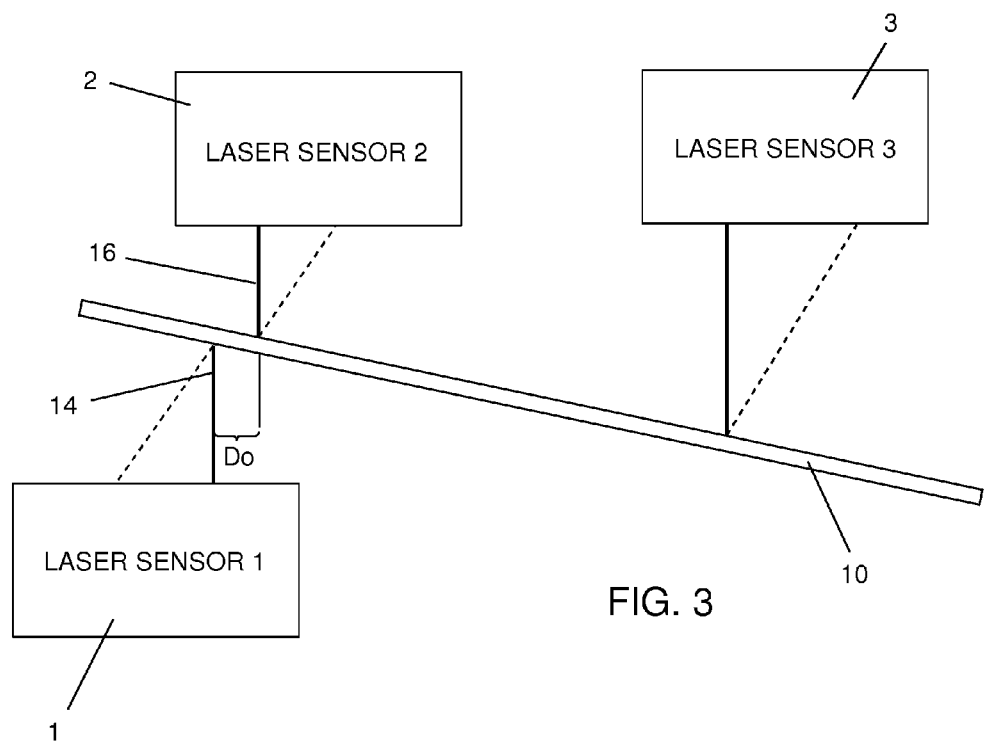
FIG. 3 is a view like FIG. 1 but illustrating a laser beam misalignment error source and with a dimension shown that is used to provide a correction factor for compensating for that misalignment.

The error resulting from the non-colinearity of the laser beams 14 and 16 is illustrated in FIG. 3. Although greatly exaggerated for purposes of illustration, the laser beams 14 and 16 may be offset by a distance of Do. Consequently, for this source of error, the measured thickness Tm is corrected by subtraction from the measured thickness Tm a colinearity correction factor Dc which equals Do(sin θ). This offset can be caused by a number of factors. If the laser beam is a line, rather than a small spot, it may not be clear where the "center" of the beam is, and the top and bottom sensors may not be colinear. In laser ranging sensors the "center" of the beam is the place where the beam has its maximum intensity, or a region where the sensor manufacturer specifies that a certain large percentage of the beam intensity falls. Measuring this beam spot profile may be difficult. Or, there may be an actual difference between the placement of the top and bottom sensors. The colinearity offset Do could be measured during setup and calibration and stored in the memory of the data processor 34 for subsequent multiplication by sin θ during operation. However, the invention uses an alternative and preferred method of calculating the colinearity correction factor Dc and that method is described in the next section.

Another source of error is thermal drift. Because a steel C-frame supports the three laser sensors 1, 2 and 3, temperature variations can vary the spacing of the arms of the C-frame from each other and from the web 10 because of the expansion and contraction of the C-frame as a function of temperature. This thermal expansion and contraction causes variations in the air gap distance A and the distance between the laser beams 16 and 24 of the laser sensors 2 and 3. In order to compensate for these thermal errors, a C-frame temperature sensor 36 (FIG. 1) is mounted on or in the C-frame to which the laser sensors 1, 2 and 3 are mounted. The output 38 of the temperature sensor 36 provides a signal representing the current, real-time sensed temperature t and applies that signal to the data processor 34 where it is stored and repeatedly updated. This sensed temperature results in a temperature correction factor Dt which can also be added to or subtracted from the measured thickness Tm. The derivation and processing of the temperature correction factor Dt is further described in the following section.

Embodiments of the invention also generate an empirical beam dynamics correction factor Db. This correction factor is used to account for other factors that may adversely influence the measurements but are not described by the theory of operation and are not specifically identified. The value of the correction factor Db is empirically obtained for each individual machine and is stored in the memory of the data processor 34 after its manufacture and before it is released to a user. The derivation and processing of the empirical beam dynamics correction factor Db is also further described in the following section.

Calibration and Data Processing

During setup and calibration of embodiments of the invention, various constants are stored in the memory of the data processor 34 for use in the subsequent data processing that is performed for measuring the thickness of the web 10. In operation, the data processor 34 processes its incoming data by performing programming steps in the usual manner. The programming steps perform operations according to mathematical algorithms for computing desired variables and ultimately an output that represents a measurement of the thickness of the web 10. The stored programming steps include those that are commonly used including trigonometric functions, multiplication, division, addition and subtraction as well as other known prior art operations. In describing the mathematical algorithms that are executed by the programmed software stored in the data processor 34, various variables and constants are referred to. The following is a table of those variable and constants:

TABLE OF VARIABLES AND CONSTANTS

Ta=actual thickness of a web detected by invention embodiment with the preferred corrections.
Tm=thickness of the web measured by the three laser sensors 1, 2 and 3 of the invention without any corrections.
A=air gap displacement (distance)
DS=distance between the laser beams of sensors 2 and 3
S1=distance from sensor 1 to one side of the web.
S2=distance from sensor 2 to opposite side of the web.
S3=distance from sensor 3 to one side of the web.
θ=passline angle
Do=offset displacement of sensor 1 from sensor 2 laser beams.
Dc=colinearity offset correction factor=Do(sin θ).
Db=empirical beam dynamics correction factor
Ct=temperature variation coefficient
Dt=temperature correction factor=Ct(t−$t_0$)
t=currently measured temperature of invention embodiment.
$t_0$=reference temperature at calibration.
e=non-thermal measurement error In order to compute a thickness value for the thickness of the web 10, the data processor computes a value of Tm that is a thickness value obtained from the distance (displacement) measurements from the three laser sensors 1, 2 and 3 to the web 10. The current, instantaneous value of Tm is computed by the data processor 34 in real time by performing the operations described by the mathematical algorithms $$Tm = (A - S1 - S2)\cos\theta$$

The value cos θ is computed from the relationships $$\tan\theta = (S2 - S3)/DS \text{ and}$$

$$\theta = \arctan(\tan\theta)$$

The value of DS is a constant that is measured at the time of setup and calibration and stored in the memory of the data processor 34.

After computing the measured thickness value Tm, the data processor can compute corrections to the measured value Tm using any one or more of the correction factors briefly described above. Data for the correction factors are determined by measurements taken in a calibration process for each constructed unit and stored in the digital data processor. Of course, where a high degree of accuracy is not required, the value of Tm can be used without any correction factor. The correction factors to be used or not used are chosen by the designer based upon the designer's technical opinion of which are needed.

If all the described correction factors are used, an actual value of the currently measured actual thickness Ta of the web 10 is computed according to $$Ta = Tm - Dc - Dt - Db = (A - S1 - S2)\cos\theta - Dc - Dt - Db$$

Temperature Correction.

The temperature correction factor Dt is computed by the data processor 34 according to Dt=Ct (t−$t_0$) where Ct is a constant that is a temperature variation coefficient with units of distance of measurement error per degree of temperature change, t is the currently measured temperature, and $t_0$ is a reference temperature measured during setup and calibration. More specifically, $t_0$ is the device temperature at which the device was calibrated to read as accurately as possible and its value is stored in the data processor 34 after each calibration of the device over its lifetime.

The temperature variation coefficient Ct is determined by a thermal drift test that is performed for each thickness gauging system. To perform the thermal drift test, a sample of web material is used that preferably is the same or closely approximates the material and thickness that will be measured in operation. The sample is supported along a passline within the measurement range of the laser sensors. The sample is not supported by the C-frame but rather is independently supported so it can not be moved by any thermal expansion or contraction of the C-frame. A series of several thickness measurements are then periodically made with the embodiment of the invention while significantly varying the temperature above and below the reference temperature $t_0$ and over a range that equals or exceeds the expected operating range of the device. Each thickness measurement is recorded in association with the temperature sensed when the thickness measurement was taken. For example, over a weekend or other time period, 200 thickness measurements are made every five minutes and their average is saved in association with the C-frame temperature during that 5 minute period. These data may be thought of as representing a graphical plot of temperature and sample thickness which will approximately fall along a straight line having a slope Ct. Although the data could be plotted and the slope determined by a visual approximation of a line centrally positioned within the data points, preferably this data is imported into a commercially available spreadsheet program, such as Microsoft Excel®. The mean and standard deviation are calculated for uncorrected thickness columns. Then outliers are removed that are greater than two standard deviations from the mean. Finally, a least squares fit routine is performed in order to determine the optimum value of the temperature variation coefficient Ct. The optimum value of Ct is then stored in the data processor 34. During subsequent operation of the embodiment of the invention, a value of the temperature correction factor Dt is repeatedly computed according to $Dt=Ct(t-t_0)$.

There are two alternatives for obtaining a value of Ct in the manner described above. The above description described recording numerous data sets over a temperature range with each data set consisting of a thickness measurement associated with a temperature at which the thickness measurement was made. In one of these alternatives for obtaining a value of Ct, these data sets have thickness measurements that each are a measured thickness Tm measured by the three laser sensors 1, 2 and 3 as described above. However, in the other alternative the thickness measurements are derived from only laser sensors 1 and 2. We have found the use of the second alternative thickness measurement for obtaining a value for the temperature variation coefficient Ct to be advantageous because we have determined it to be somewhat more accurate. That may be because thermal expansion and contraction occurs primarily in a direction parallel to the laser beams 14, 16 and 24.

Because the data from the temperature gauges and other sensors are processed in a data processor, intermediate values that are derived during the processing are readily available. The thickness of a web as measured only by laser gauges 1 and 2 is the value of A−S1−S2. Consequently, that value can be used as the measured value of the sample thickness in the second alternative procedure for determining the temperature variation coefficient Ct as described above.

Colinearity Offset and Empirical Correction Factors

For correcting any colinearity offset Do, the colinearity offset correction factor Dc can be computed by multiplying a stored value of Do by the currently determined value of $\sin\theta$. However, the colinearity offset correction factor Dc is preferably determined by alternative processing along with an empirical beam dynamics correction factor Db.

If non-colinearity of the laser beams of sensors 1 and 2 and thermal drift were the only sources of error, no further correction would be useful. However they are not. On the other hand, if they were the principal sources of error, any further correction factor should be small compared to both the colinearity offset correction factor Dc and the temperature correction factor Dt. One possible source of additional error is that one or more of the laser sensor beams is not precisely parallel to the other laser beams. Another possible source of error may be that the laser beams of the preferred laser sensors do not illuminate a single point on the surface of the web. Instead, they illuminate a line as previously described.

Regardless of whether remaining sources of error are known or identified, the accuracy of embodiments of the invention is improved by the use of an empirical beam dynamics correction factor Db. The correction factor Db is a lumped correction factor representing the sum of the measurement errors from all additional error sources and is therefore subtracted from the measured thickness Tm in the same manner as the other correction factors. As with all of the correction factors, those skilled in the art will recognize that the actual sign of the value of a correction factor (i.e. whether it is arithmetically added or subtracted) is the usual matter of the direction chosen as a positive convention and whether the error is in the chosen positive direction or in the opposite direction. Because whether a number is arithmetically added or subtracted is dependent upon the direction chosen as the positive convention, the term "algebraically summed" is a more accurate description of the mathematical operation and is used in the claims because it accommodates either direction chosen as the positive convention.

As previously discussed, the actual currently measured thickness Ta is computed by algebraically summing (subtracting in the chosen convention) the correction factors from the measured thickness Tm. That operation is described by the relationship $Ta=Tm-Dt-[Dc+Db]$. The assumption is made that non-thermal measurement errors $e=[Dc+Db]$ can be approximated as a linear function of $\sin\theta$ (i.e. by a line which has the form of $y=mx+b$). Because $Dc=Do(\sin\theta)$, the term $[Dc+Db]=Do(\sin\theta)+Db$ which represents a straight line plotted on a graph of a measurement error e as a function of the sine of the passline angle $\theta$.

This concept of assuming that non-thermal measurement errors e can be approximated as a linear function of $\sin\theta$ in the form of $e=Do(\sin\theta)+Db$ allows the values of Do and Db to be determined. The thickness of a web sample is measured to provide a known web sample thickness. A series of measurements of the sample web are made across a range of passline angles $\theta$. For example, we have placed the sample of known thickness at a zero degree passline angle (i.e. parallel to the reference plane 18) and recorded a thickness measurement, then repeated the thickness measurement for several + and − passline angle values (e.g. ±2°, ±4°, ±6°, ±8°). This procedure generates a series of data sets that are recorded in which each data set is a passline angle $\theta$ associated with a thickness measurement Tm. These data can be converted to data sets in which each thickness measurement is converted to a thickness error e by subtracting the known thickness from the measured thickness Tm and the passline angles are converted to sin G. In the manner previously described, the data set values could be plotted on a graph and a best fit line drawn on the graph from the plotted data points. From that line the values of Do and Db can be determined using the fact that the straight line on the graph is represented by Do(sin θ)+Db. However, as before, the values of Do and Db are preferably determined by using a least squares fit routine, such as is available in Excel® spreadsheet software. The least squares fit routine calculates the best combination of Do and Db that produced the most accurate results across the entire range of angles. The values of Do and Db are then stored in the data processor 34 for use in computing thickness values according to the previously described algorithms.

As an example of the effectiveness of this correction procedure, the result of a least squares fit gave a value of Do=0.62400 mm, and Db=−0.00551 mm. For a five degree angle the Do(sin θ) term=0.0544. This is an offset correction of 54.4 microns. The Do(sin θ) term is almost ten times the Db term which indicates that the offset correction accounts for the principal error. The Db term helps by providing additional correction, but its correction is at the level of 5.5 microns. We have also found that, compared to thickness measurements with a two laser system, the variation, as measured by standard deviation, of the sample thicknesses from the corrected thickness was reduced from +/−87 to +/−16 microns for one measurement gauge embodying the invention and from +/−77 to +/−12 microns for another measurement gauge embodying the invention.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A laser thickness gauge for detecting the thickness of a target web extending along a passline plane, the gauge comprising:
   (a) a pair of laser displacement sensors each capable of transmitting a laser beam, spaced apart by an air gap distance A, and comprising a first laser sensor spaced from a first side of the passline plane and a second laser sensor spaced from a second, opposite side of the passline plane, the sensors being oriented to direct their laser beams parallel to and toward each other and intersecting a reference plane at 90°, the first laser sensor having an output providing a signal representing the distance S1 between the first sensor and the web, the second laser sensor having an output providing a signal representing the distance S2 between the second sensor and the web;
   (b) a third laser displacement sensor capable of transmitting a laser beam, spaced from the passline plane and located on the same side of the passline plane as the second laser sensor to have its laser beam spaced along the passline by a distance DS away from the laser beam of the second sensor, the third sensor oriented to direct its laser beam parallel to the laser beams of the pair of laser sensors and having an output providing a signal representing the distance S3 between the third sensor and the web; and
   (c) a digital data processor including a storage memory for storing processing instructions and a value A representing the distance between the first laser sensor and the second laser sensor, the processor having an output and having inputs connected respectively to the outputs of the three laser sensors and receiving in real time a signal representing the distances S1, S2 and S3, the processor including a stored algorithm that computes in real time a measured thickness Tm of a web positioned along the passline plane in accordance with $$\tan\theta=(S2-S3)/DS,$$

$$\text{passline angle}\,\theta=\arctan(\tan\theta) \text{ and}$$

$$Tm=(A-S1-S2)\cos\theta,$$

wherein θ is an angle between the reference plane and the passline plane and wherein the three laser sensors are mounted in an orientation so their parallel laser beams are oriented at an oblique angle to the passline plane.

2. A laser thickness gauge in accordance with claim 1 wherein the processor has a stored value of an offset displacement Do of the first laser sensor from the second laser sensor and includes a stored algorithm that computes a colinearity offset correction factor Dc from Dc=Do(sin θ) and algebraically sums the colinearity offset correction factor Dc beam dynamics correction factor Db with the measured thickness Tm to compute a corrected thickness.

3. A laser thickness gauge in accordance with claim 2 wherein the processor has a stored value of a beam dynamics correction factor Db and includes a stored algorithm that also algebraically sums the beam dynamics correction factor Db with the measured thickness Tm to compute a corrected thickness.

4. A laser thickness gauge in accordance with claim 3 and further comprising a support frame to which the laser sensors are mounted, a frame temperature sensor sensing the temperature t of the frame and having an output connected to the processor for computing the sensed temperature t to the processor, the processor has an experimentally obtained stored value of a temperature variation coefficient Ct and a stored temperature $t_0$ at which the thickness gauge was calibrated, includes a stored algorithm for computing a temperature correction factor Dt from Dt=Ct(t−$t_0$) and a stored algorithm that also algebraically sums the temperature correction factor Dt with the measured thickness Tm to compute a corrected thickness.

5. A laser thickness gauge in accordance with claim 1 wherein the processor has a stored value of an offset displacement Do of the first laser sensor from the second laser sensor and includes a stored algorithm that computes a colinearity offset correction factor Dc from Dc=Do(sin θ) and algebraically sums the colinearity offset correction factor Dc beam dynamics correction factor Db with the measured thickness Tm to compute a corrected thickness.

6. A laser thickness gauge in accordance with claim 1 wherein the processor has a stored value of a beam dynamics correction factor Db and includes a stored algorithm that also algebraically sums the beam dynamics correction factor Db with the measured thickness Tm to compute a corrected thickness.

7. A laser thickness gauge in accordance with claim 1 and further comprising a support frame to which the laser sensors are mounted, a frame temperature sensor sensing the temperature t of the frame and having an output connected to the processor for computing the sensed temperature t to the processor, the processor has an experimentally obtained stored value of a temperature variation coefficient Ct and a stored temperature $t_0$ at which the thickness gauge was calibrated, includes a stored algorithm for computing a temperature correction factor Dt from $Dt=Ct(t-t_0)$ and a stored algorithm that also algebraically sums the temperature correction factor Dt with the measured thickness Tm to compute a corrected thickness.

8. A method for measuring the thickness Ta of a target web extending along a passline plane using laser displacement sensors that have parallel laser beams incident upon the web at an oblique, non-perpendicular angle, the method comprising:
   (a) measuring the distances S1 and S2 to transversely opposite locations on opposite sides of the web from a pair of the laser displacement sensors that are mounted on opposite sides of the web and spaced apart by an air gap distance A;
   (b) measuring the distance S3 to the web from a third one of the laser displacement sensors that is longitudinally offset along the web by a distance DS from, and on the same side of the web as, one of the pair of laser displacement sensors;
   (c) computing the oblique, non-perpendicular angle of incidence of the laser beams on the web from $\tan \theta = (S2-S3)/DS$ and $\theta = \arctan(\tan \theta)$;
   (d) computing in real time a measured thickness Tm from $Tm = (A-S1-S2)\cos \theta$.

9. A method according to claim 8 and further comprising storing a value of an offset displacement Do of the first laser sensor from the second laser sensor, computing a colinearity offset correction factor Dc from $Dc=Do(\sin \theta)$ and algebraically summing the colinearity offset correction factor Dc with the thickness Tm measured by the three laser sensors to compute a corrected thickness measurement.

10. A method according to claim 9 and further comprising storing a value of a beam dynamics correction factor Db and also algebraically summing the beam dynamics correction factor Db with the measured thickness Tm to compute a corrected thickness.

11. A method according to claim 10 and further comprising:
   (a) storing an experimentally obtained value of a temperature variation coefficient Ct;
   (b) measuring a temperature $t_0$ of a support frame to which the laser sensors are mounted during a calibration of the measuring steps and storing the temperature $t_0$;
   (c) periodically sensing and storing a temperature t of the support frame;
   (d) computing a temperature correction factor Dt from $Dt=Ct(t-t_0)$; and also
   (e) algebraically summing the temperature correction factor Dt with the measured thickness Tm to compute a corrected thickness.

12. A method according to claim 8 and further comprising storing a value of a beam dynamics correction factor Db and also algebraically summing the beam dynamics correction factor Db with the measured thickness Tm to compute a corrected thickness.

13. A method according to claim 8 and further comprising:
   (a) storing an experimentally obtained value of a temperature variation coefficient Ct;
   (b) measuring a temperature $t_0$ of a support frame to which the laser sensors are mounted during a calibration of the measuring steps and storing the temperature $t_0$;
   (c) periodically sensing and storing a temperature t of the support frame;
   (d) computing a temperature correction factor Dt from $Dt=Ct(t-t_0)$; and also
   (e) algebraically summing the temperature correction factor Dt with the measured thickness Tm to compute a corrected thickness.

* * * * *